United States Patent
Freeman et al.

(10) Patent No.: US 9,938,846 B2
(45) Date of Patent: Apr. 10, 2018

(54) TURBINE SHROUD WITH SEALED BLADE TRACK

(71) Applicants: Rolls-Royce Corporation, Indianapolis, IN (US); Rolls-Royce North American Technologies, Inc., Indianapolis, IN (US)

(72) Inventors: Ted J. Freeman, Danville, IN (US); David J. Thomas, Brownsburg, IN (US); Joseph P. Lamusga, Indianapolis, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 475 days.

(21) Appl. No.: 14/735,802

(22) Filed: Jun. 10, 2015

(65) Prior Publication Data
US 2015/0377050 A1    Dec. 31, 2015

Related U.S. Application Data

(60) Provisional application No. 62/018,155, filed on Jun. 27, 2014.

(51) Int. Cl.
| | | |
|---|---|---|
| *F01D 11/08* | (2006.01) | |
| *F01D 11/00* | (2006.01) | |
| *F01D 5/14* | (2006.01) | |
| *F01D 25/24* | (2006.01) | |

(52) U.S. Cl.
CPC .............. *F01D 11/005* (2013.01); *F01D 5/14* (2013.01); *F01D 11/08* (2013.01); *F01D 25/246* (2013.01); *F05D 2240/11* (2013.01); *F05D 2300/6033* (2013.01); *Y02T 50/672* (2013.01)

(58) Field of Classification Search
CPC ...... F01D 11/005; F01D 11/08; F01D 25/246; F01D 5/14; F05D 2240/11; F05D 2300/6033; Y02T 50/672
See application file for complete search history.

(56) References Cited

U.S. PATENT DOCUMENTS

| | | |
|---|---|---|
| 5,988,975 A | 11/1999 | Pizzi |
| 6,808,363 B2 | 10/2004 | Darkins, Jr. et al. |
| 6,935,836 B2 | 8/2005 | Ress, Jr. et al. |
| 7,033,138 B2 | 4/2006 | Tomita et al. |
| 8,128,343 B2 | 3/2012 | Schiavo et al. |

(Continued)

FOREIGN PATENT DOCUMENTS

EP    0709550 A1    5/1996

OTHER PUBLICATIONS

Extended Search Report for related European Patent Application No. 15171757.6-1610, search completed Oct. 23, 2015, 8 pages.

*Primary Examiner* — William McCalister
(74) *Attorney, Agent, or Firm* — Barnes & Thornburg LLP

(57) ABSTRACT

A turbine shroud for a gas turbine engine includes a plurality of shroud segments arranged around a central axis. Each shroud segment includes a carrier component, a blade track component, and a retainer component that couples the blade track component to the carrier component. The turbine shroud further includes a plurality of circumferential seals that seal circumferential interfaces between the shroud segments.

16 Claims, 5 Drawing Sheets

(56) References Cited

U.S. PATENT DOCUMENTS

| | | | |
|---|---|---|---|
| 8,439,629 B2* | 5/2013 | Pietraszkiewicz | F01D 11/08 |
| | | | 415/116 |
| 8,579,580 B2 | 11/2013 | Albers et al. | |
| 8,596,962 B1* | 12/2013 | Liang | F01D 11/08 |
| | | | 415/116 |
| 8,998,572 B2* | 4/2015 | Lutjen | F04D 29/164 |
| | | | 415/173.1 |
| 9,228,447 B2* | 1/2016 | McCaffrey | F01D 11/22 |
| 9,587,504 B2* | 3/2017 | McCaffrey | F01D 11/08 |
| 2003/0053050 A1 | 3/2003 | Potyrailo et al. | |
| 2004/0047725 A1* | 3/2004 | Tomita | F01D 11/005 |
| | | | 415/116 |
| 2005/0232752 A1 | 10/2005 | Meisels | |
| 2007/0025837 A1 | 2/2007 | Pezzetti et al. | |
| 2009/0053050 A1* | 2/2009 | Bruce | F01D 25/04 |
| | | | 415/200 |
| 2009/0092485 A1* | 4/2009 | Bridges, Jr. | F01D 11/008 |
| | | | 415/173.7 |
| 2009/0096174 A1* | 4/2009 | Spangler | F01D 11/005 |
| | | | 277/345 |
| 2011/0044801 A1 | 2/2011 | Di et al. | |
| 2011/0056055 A1 | 3/2011 | Gendraud et al. | |
| 2011/0232752 A1* | 9/2011 | Mataki | C09K 11/06 |
| | | | 136/257 |
| 2013/0004306 A1 | 1/2013 | Albers et al. | |
| 2013/0177411 A1 | 7/2013 | Weber et al. | |
| 2013/0266416 A1* | 10/2013 | Bergman | F01D 25/246 |
| | | | 415/1 |
| 2014/0030072 A1 | 1/2014 | Hillier et al. | |
| 2016/0362992 A1* | 12/2016 | Roy Thill | F01D 5/14 |

* cited by examiner

TURBINE SHROUD WITH SEALED BLADE TRACK

CROSS REFERENCE TO RELATED APPLICATIONS

This application claims priority to and the benefit of U.S. Provisional Patent Application No. 62/018,155, filed 27 Jun. 2014, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds sometimes include sealing elements between parts to block air from leaking through the shroud during operation of the gas turbine engine. Thus, more air is forced to pass over the blades included in the rotating wheel assemblies which extract work from the air.

SUMMARY

The present application discloses one or more of the features recited in the appended claims and/or the following features which, alone or in any combination, may comprise patentable subject matter.

According to an aspect of the present disclosure, a segmented turbine shroud that extends around a central axis is taught. The segmented turbine shroud may include a first shroud segment and a second shroud segment. The first shroud segment may include a first carrier segment, a first blade track segment, and a first retainer that couples the first carrier segment to the first blade track segment. The first blade track segment may be made from a ceramic-matrix-composite material. The second shroud segment may be arranged circumferentially adjacent to the first shroud segment around the central axis. The second shroud segment may include a second carrier segment, a second blade track segment, and a second retainer that couples the second carrier segment to the second blade track segment. The second blade track segment may be made from a ceramic-matrix-composite material.

In some embodiments, the segmented turbine shroud may also include a circumferential seal arranged between the first shroud segment and the second shroud segment to block gasses from passing through a circumferential interface of the first shroud segment and the second shroud segment. The circumferential seal may engage a first seal-locating feature formed in the first carrier segment and a second seal-locating feature formed in the second carrier segment so that the circumferential seal is held in place circumferentially between the first shroud segment and the second shroud segment.

In some embodiments, each carrier segment may include a central attachment body engaged with a corresponding blade track segment and a pair of end caps that extend circumferentially in opposing directions from the central attachment body. Each end cap may be formed to include a seal-locating feature.

In some embodiments, the circumferential seal may be a strip seal. The first seal-locating feature may be a first seal-receiving slot that extends circumferentially into the first carrier segment. The second seal-locating feature may be a second seal-receiving slot that extends circumferentially into the second carrier segment.

In some embodiments, the pair of endcaps may close off circumferential ends of a radially inwardly opening channel formed by the central attachment body.

In some embodiments, a closed cavity may be formed by the first shroud segment between the first carrier segment and the first blade track segment. The closed cavity may extend along the central attachment body of the first carrier segment. The closed cavity may be circumferentially bounded by the pair of end caps.

In some embodiments, the central attachment body of the first carrier segment may be formed to include a spar, a forward hanger bracket coupled to the spar, and an aft hanger bracket coupled to the spar. The first blade track segment may include a runner, a forward hanger arm that engages the forward hanger bracket included in the first carrier segment, and an aft hanger arm that is engaged along with the aft hanger bracket of the first carrier segment by the first retainer.

In some embodiments, the first blade track segment may include a runner, a forward hanger arm that engages the first carrier segment, and an aft hanger arm that is engaged along with the first carrier segment by the first retainer. The forward hanger arm may include a first portion that extends outward in a radial direction and a second portion that extends forward in an axial direction. The aft hanger arm may include a first portion that extends outward in the radial direction and a second portion that extends rearward in the axial direction. The first retainer may form an axially-opening channel that receives the second portion of the aft hanger arm included in the first blade track segment.

According to another aspect of the present disclosure, a turbine shroud segment may include a carrier segment, a blade track segment, and a retainer. The carrier segment may include a central attachment body and a pair of end caps that extend in opposing directions from the central attachment body. Each end cap may be formed to include a seal-locating feature. The blade track segment may be made from a ceramic-matrix-composite material and may be supported by the first carrier segment.

In some embodiments, the retainer may receive a portion of the carrier segment. The retainer may also receive a portion of the blade track segment to couple the blade track segment to the carrier segment.

In some embodiments, the seal-locating feature included in each end cap may be a seal-receiving slot that extends circumferentially into the carrier segment. Each seal-receiving slot included in each end cap may be sized to receive a strip seal.

In some embodiments, a closed cavity may be formed between the carrier segment and first blade track segment. The closed cavity may extend along the central attachment body of the first carrier segment. The closed cavity may be circumferentially bounded by the pair of end caps.

In some embodiments, the central attachment body of the carrier segment may be formed to include a spar, a forward hanger bracket that extends radially inwardly from the spar, and an aft hanger bracket that extends radially inwardly from the spar. The closed cavity may extend axially from the forward hanger bracket to the aft hanger bracket.

In some embodiments, the blade track segment may be formed to include a runner, a forward hanger arm that extends radially outwardly from the runner, and an aft hanger arm that extends radially outwardly from the runner. The closed cavity may extend axially from the forward hanger arm to the aft hanger arm.

In some embodiments, the forward hanger arm may include a first portion that extends outward in a radial direction and a second portion that extends forward in an axial direction. The aft hanger arm may include a first portion that extends outward in the radial direction and a second portion that extends rearward in the axial direction. The retainer may form an axially-opening channel that receives the second portion of the aft hanger arm included in the blade track segment.

According to another aspect of the present disclosure, a method of making a turbine shroud adapted for use in a gas turbine engine is taught. The method may include assembling a first shroud segment and assembling a second shroud segment. Assembling the first shroud segment may be accomplished by moving a first blade track segment made from a ceramic matrix composite material into a predetermined position relative to a first carrier and inserting a portion of both the first blade track segment and the first carrier into a first retainer to couple the first blade track segment to the first carrier. Assembling the second shroud segment may be accomplished by moving a second blade track segment made from a ceramic matrix composite material into a predetermined position relative to a second carrier and inserting a portion of both the second blade track segment and the second carrier into a second retainer to couple the second blade track segment to the second carrier.

In some embodiments, the method may include inserting a strip seal into a first seal-receiving slot formed in the first carrier and into a second seal-receiving slot formed in the second carrier so that the strip seal extends from the first shroud segment to the second shroud segment. In some embodiments, the first carrier segment may include a central attachment body engaged with the first blade track and a pair of end caps that extend circumferentially in opposing directions from the central attachment body and each end cap is formed to include a seal-locating feature.

In some embodiments, a closed cavity may be formed by the first shroud segment between the first carrier segment and the first blade track segment upon assembly of the first shroud segment. The closed cavity may extend along the central attachment body of the first carrier segment. The closed cavity may be circumferentially bounded by the pair of end caps.

These and other features of the present disclosure will become more apparent from the following description of the illustrative embodiments.

DETAILED DESCRIPTION

Figure 1:
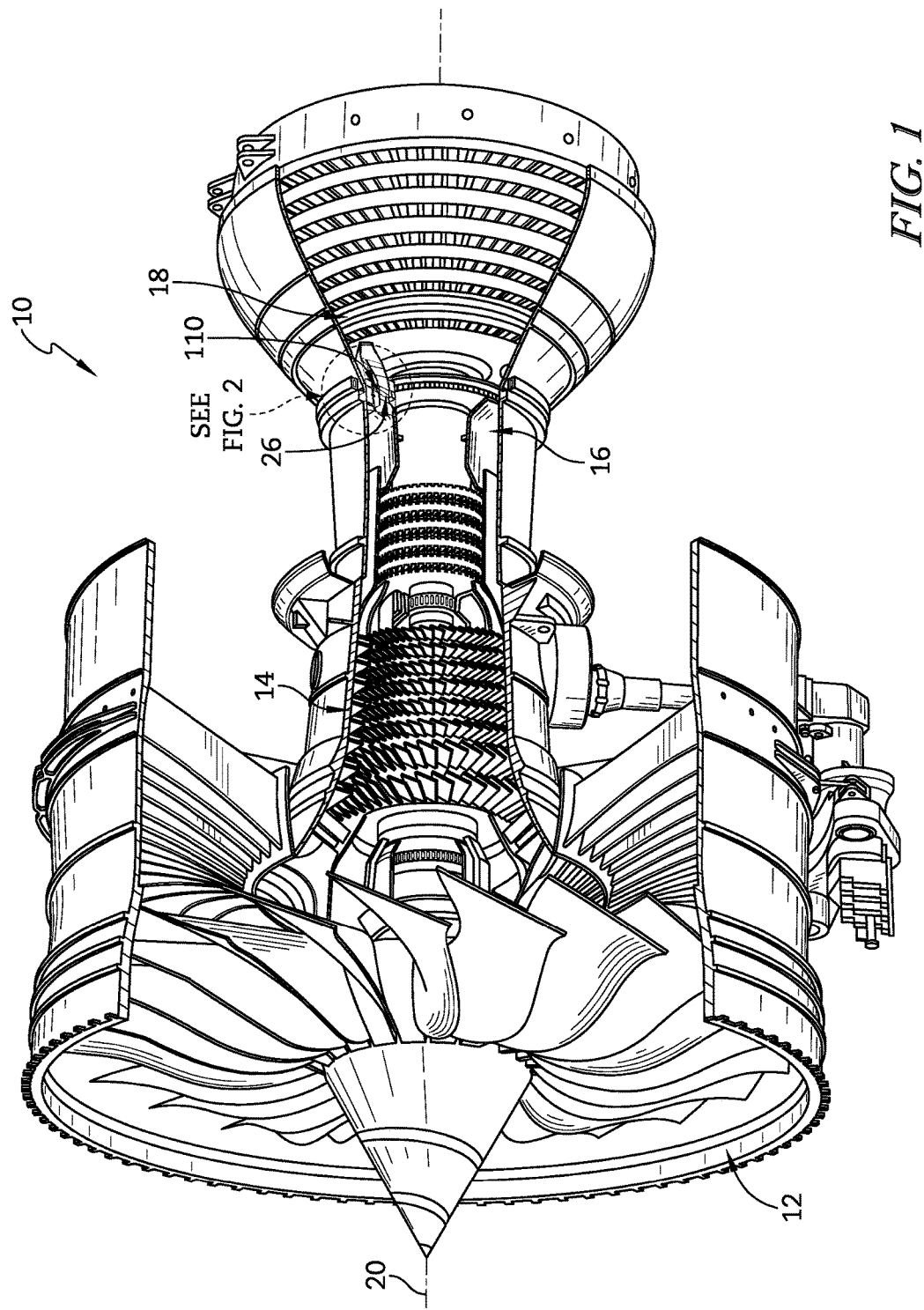
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

An illustrative aerospace gas turbine engine 10 cut-away in FIG. 1 to show that the engine 10 includes a fan 12, a compressor 14, a combustor 16, and a turbine 18. The fan 12 is driven by the turbine 18 and provides thrust for propelling an air vehicle (not shown). The compressor 14 is compresses and delivers air to the combustor 16. The combustor 16 mixes fuel with the compressed air received from the compressor 14 and ignites the fuel. The hot high pressure products of the combustion reaction in the combustor 16 are directed into the turbine 18 to cause the turbine 18 to rotate about an axis 20 and drive the compressor 14 and the fan 12.

Figure 2:
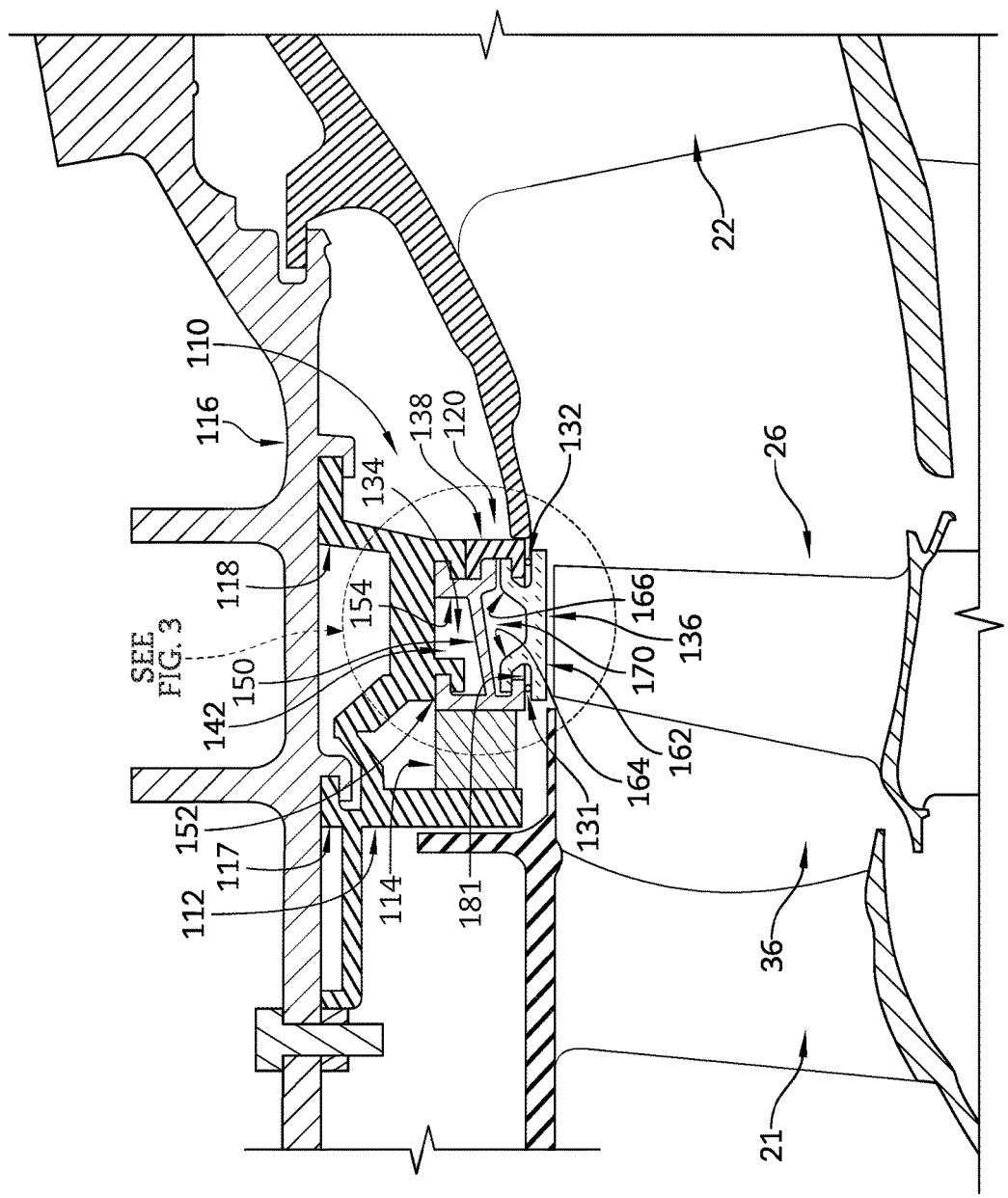
FIG. 2 is a partial cross-sectional view of the gas turbine engine of FIG. 1 showing the arrangement of a segmented turbine shroud radially outward from blades of a turbine wheel assembly in the gas turbine engine to block gasses from passing over the blades without interacting with the blades.

Referring now to FIG. 2, a portion of the turbine 18 is shown to include static turbine vane assemblies 21, 22 and a turbine wheel assembly 26. The vane assemblies 21, 22 extend across the flow path of the hot, high-pressure combustion products from the combustor 16 to direct the combustion products toward blades 36 of the turbine wheel assembly 26. The blades 36 are in turn pushed by the combustion products to cause the turbine wheel assembly 26 to rotate; thereby, driving the rotating components of the compressor 14 and the fan 12.

Figure 3:
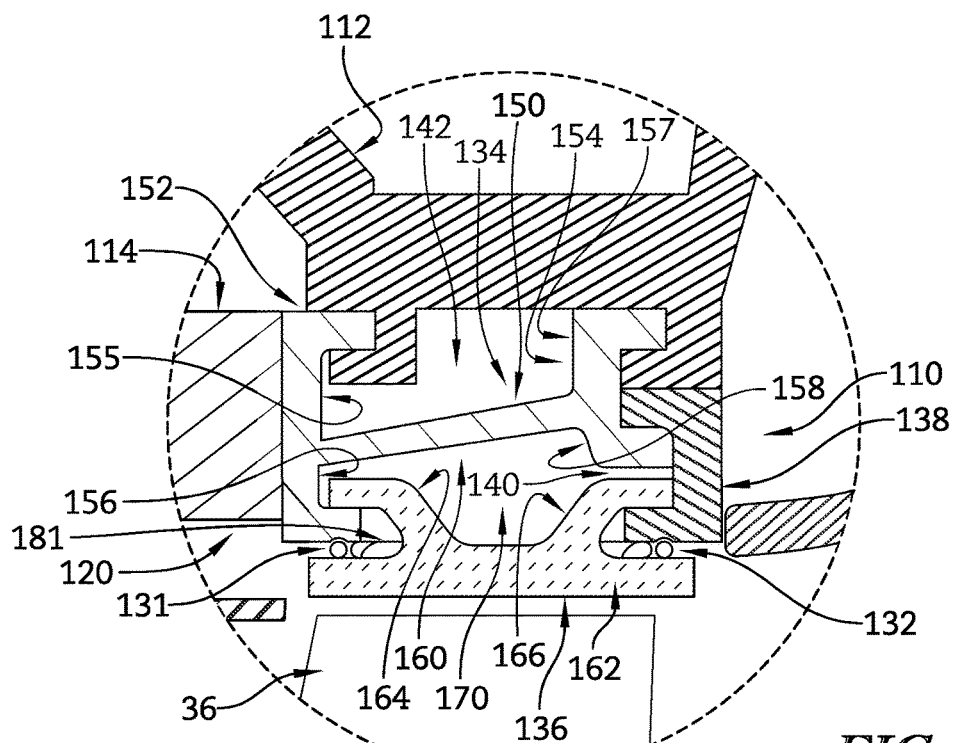
FIG. 3 is a detail view of a portion of FIG. 2 showing a central section of one circumferential shroud segment and showing that the segmented turbine shroud includes carrier segments, blade track segments, and retainers that couple the blade track segments to the carrier segments.

The turbine 18 also includes a turbine shroud 110 that extends around turbine wheel assembly 26 to block combustion products from passing over the blades 36 without pushing the blades 36 to rotate as shown in FIGS. 2 and 3. Combustion products that are allowed to pass over the blades 36 do not push the blades 36 and such passed-over products contribute to lost performance within the engine 10.

The turbine shroud 110 illustratively includes a mount ring 112, a retainer ring 114, and a plurality of shroud segments 120 as shown in FIG. 2. The mount ring 112 is coupled to a turbine case 116 and includes a pair of L-shaped hanger brackets 117, 118 that extend inwardly in a radial direction from a mount body 119 to support the plurality of shroud segments 120. The retainer ring 114 engages the mount ring 112 and the plurality of shroud segments 120 to hold the shroud segments 120 in place relative to the mount ring 112. The shroud segments 120 are supported relative to the turbine case 116 by the mount ring 112 and retainer ring 114 in position adjacent to the blades 36 of the turbine wheel assembly 26. In other embodiments, the shroud segments 120 may be coupled directly to the turbine case 116 or may be supported relative to the turbine case 116 by another suitable arrangement.

Figure 5:
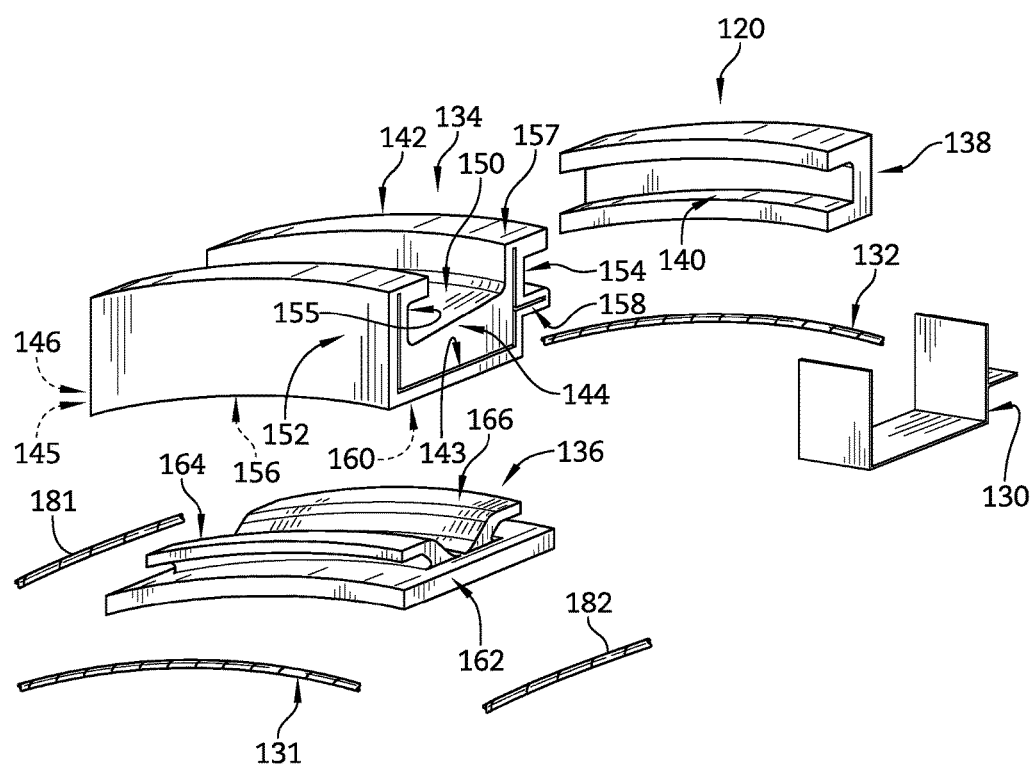
FIG. 5 is an exploded perspective view of a shroud segment included in the turbine shroud shown in FIGS. 2-4 showing the carrier segment, the blade track segment, and the retainer included in a single shroud segment and showing a strip seal used to close gaps between shroud segments.
Figure 6:
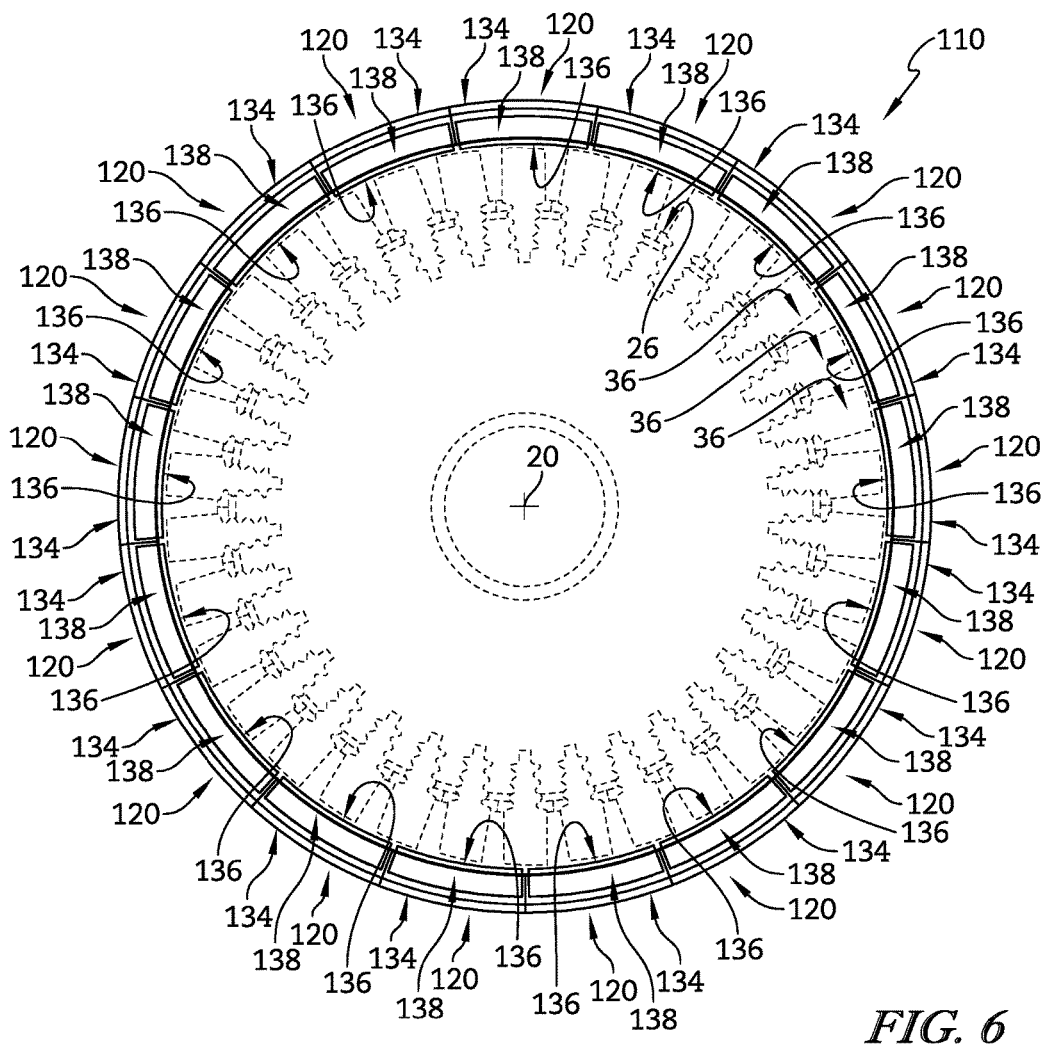
FIG. 6 is a rear elevation view of the turbine shroud of FIGS. 2-4 showing that the shroud segments of the turbine shroud cooperate to form a full ring sized to extend around a turbine wheel assembly.

The plurality of shroud segments 120 are illustratively assemblies that are arranged circumferentially adjacent to one another to form a ring around the turbine wheel assembly 26 as shown, for example, in FIG. 6. Circumferential seals 130 are illustratively strip seals arranged circumferentially between the shroud segments 120 to block gasses from passing through a circumferential interface 122 between shroud segments 120 as shown in FIG. 5. The strip seals 130 are illustratively located in slots 143 formed in relatively cool carrier segments 134 that hold relatively hot blade track segments 136 included in each shroud segment 120 such that locating slots need not be formed in the blade track segments 136.

Each shroud segment 120 includes a carrier segment 134, a blade track segment 136, and a retainer 138 as shown, for example, in FIG. 5. The carrier segments 134 support the circumferential seals 130 and are coupled to the mount ring 112 to secure the shroud segments 120 to the turbine case 116 as suggested in FIGS. 2 and 3. The blade track segments 136 extend around the turbine wheel assembly 26 and block hot gasses from passing over the blades 36. The retainers 138 are illustratively shaped to form channels 140 that receive portions of corresponding blade track segments 136 and portions of carrier segments 134 to couple the blade track segments 136 to corresponding carrier segments 134.

Figure 4:
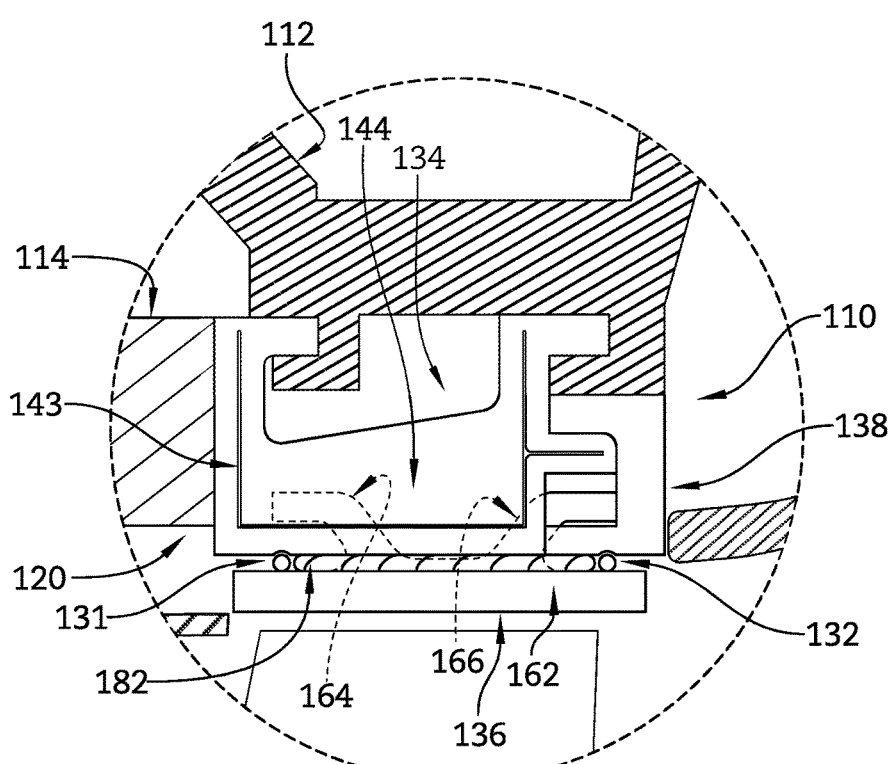
FIG. 4 is a view similar to FIG. 3 taken at the end of one circumferential shroud segment that makes up the turbine shroud of FIGS. 2 and 3 showing that each carrier segment includes a seal-receiving slot that locates a seal between circumferentially adjacent shroud segments.

Radial seal elements 131, 132 extend circumferentially along forward and aft sides of each shroud segment 120 as suggested in FIG. 5. The radial seal elements 131, 132 are illustratively rope seals arranged radially between the carrier segments 134 and the blade track segments 136 as shown in FIGS. 3-5. The radial seal elements 131, 132 block gasses from passing through radial interfaces of components included in the shroud segments 120. In other embodiments, other types of seals may be used as radial seal elements 131, 132.

Axial seal elements 181, 182 extend circumferentially along forward and aft sides of each shroud segment 120 as suggested in FIG. 5. The axial seal elements 181, 182 are illustratively rope seals arranged radially between the carrier segments 134 and the blade track segments 136 as shown in FIGS. 3-5. The axial seal elements 131, 132 block gasses from passing through radial interfaces of components included in the shroud segments 120. In other embodiments, other types of seals may be used as axial seal elements 181, 182.

In the illustrative embodiment, each carrier segment 134 includes a central attachment body 142, a first end cap 144, and second end cap 146 as shown in FIG. 5. Each carrier segment 134 is illustratively made from a metallic material but in other embodiments may be made from a ceramic material, a composite material such as a ceramic-matrix-composite material (CMC), or another suitable material. The central attachment body 142 is illustratively is configured to engage both the mount ring 112 and the blade track segments 136 to support the blade track segments 136 as shown in FIG. 3. The end caps 142, 144 are each formed to include a corresponding seal-locating feature 143, 145 and extend circumferentially in opposite directions from ends of the central attachment body 142.

The central attachment body 142 is formed to include a spar 150, a forward hanger bracket 152, and an aft hanger bracket 154 as shown in FIG. 3. The spar 150 extends radially away from the axis 20 as it extends axially along the axis 20 to form a frustoconical ring. The forward hanger bracket 152 is coupled to a forward axial end of the spar 150 and has a C-shaped cross-section that opens rearwardly in the axial direction and engages the mount ring 112 along with a corresponding blade track segment 136. The aft hanger bracket 154 is coupled to an aft axial end of the spar 150 and has a C-shaped cross-section that opens rearwardly in the axial direction and engages the mount ring 112 along with a corresponding retainer 138.

The forward hanger bracket 152 is illustratively made up of an outer inverted L-shaped cross-sectional portion 155 and an inner L-shaped cross-sectional portion 156 as shown in FIG. 3. The outer inverted L-shaped cross-sectional portion 155 extends outward in the radial direction from the spar 150 and engages the mount ring 112. The inner L-shaped cross-sectional portion 156 extends inward in the radial direction from the spar 150 and engages a corresponding blade track segment 136.

The aft hanger bracket 154 is illustratively made up of an outer inverted L-shaped cross-sectional portion 157 and an inner L-shaped cross-sectional portion 158 as shown in FIG. 3. The outer inverted L-shaped cross-sectional portion 157 extends outward in the radial direction from the spar 150 and engages the mount ring 112. The inner L-shaped cross-sectional portion 158 extends inward in the radial direction from the spar 150 and is received in the channel 140 of a corresponding retainer 138.

The end caps 142, 144 of each carrier segment 134 close off the circumferential ends of a radially inwardly opening channel 160 formed by the spar 150 and inner L-shaped cross-sectional portions 156, 158 of the central attachment body 142 as shown in FIG. 5. As mentioned above, each end cap 142, 144 is formed to include a corresponding seal-locating feature 143, 145. Each seal-locating feature is illustratively embodied as a seal-receiving slot sized to receive strip seals as suggested in FIG. 5.

The blade track segment 136 of each shroud segment assembly 120 is illustratively a monolithic ceramic component made from ceramic-matrix-composite materials (CMCs) that are adapted to withstand high temperature environments. In other embodiments, the blade track segment 136 of each shroud segment assembly 120 may be made from other materials. Each blade track segment 136 illustratively includes an arcuate runner 162, a forward hanger arm 164 that extends outwardly in the radial direction from the runner 162, and an aft hanger arm 166 that extends outwardly in the radial direction from the runner 162 as shown in FIGS. 3 and 5. The runner 162 extends around the blades 36 of the turbine wheel assembly 26 and blocks gasses from passing over the blades 36. Accordingly, the runners 162 of each blade track segment 136 cooperate to define the outer edge of the flow path for air moving through the turbine 18. The forward and the aft hanger arms 164, 166 support the runner 162 relative to a corresponding carrier segment 134.

The forward hanger arm 164 illustratively has an inverted L-shape cross-section that extends forward in the axial direction to engage the inner L-shaped portion of the forward hanger bracket 152 included in a corresponding carrier segment 134 as shown in FIGS. 3 and 5. The aft hanger arm 166 also has an inverted L-shape cross-section; however, the aft hanger arm 166 extends rearward in the axial direction and is received in the channel of a corresponding retainer 138, along with the inner L-shaped portion 158 of the aft hanger bracket 154 included in a corresponding carrier segment 134, to couple the blade track segment 136 to the carrier segment 134.

In other embodiments, the axial direction of one or both of the forward and the aft hanger arms 164, 166 may be reversed. In one example, the forward hanger arm 164 could extend rearward in the axial direction and the aft hanger arm 166 could also extend rearward. In another example, both the forward hanger arm 164 and the aft hanger arm 166 could extend rearward in the axial direction.

Figure 7:
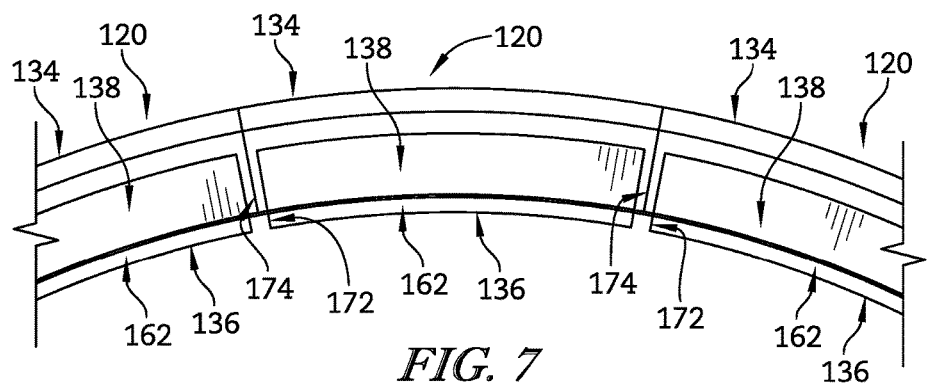
FIG. 7 is a detail view of a portion of FIG. 6 showing that aft hangers of the carrier component and the blade track component are received in the retainer component to couple the blade track component to the carrier component.

The retainer 138 of each shroud segment assembly 120 has a C-shaped cross-section that forms the channel 140, which is sometimes called a bird-mouth, as shown in FIGS. 3 and 5. Each retainer 138 receives the aft hanger arm 166 of a blade track segment 136 and the inner L-shaped portion 158 of an aft hanger bracket 154 included in the carrier segment 134 to retain the blade track segment 136 in place relative to the carrier segment 134. In the illustrative embodiment, each retainer 138 is sized to extend circumferentially along only a portion of a turbine shroud segment 120 between the end caps 142, 144 of a carrier segment 134 as shown in FIGS. 6 and 7.

In the illustrative embodiment, when a turbine shroud segment 120 is assembled, a closed cavity 170 is formed between the carrier segment 134 and the blade track segment 136 as shown in FIG. 3. The closed cavity 170 extends along the central attachment body 140 of the carrier segment 134 and is circumferentially bounded by the end caps 142, 144. The cavities 170 of each turbine shroud segment 120 are independent from one another and are sealed from airflow from most adjacent cavities. Cooling air may be supplied to the cavities 170 to cool the runner 162 of each blade track segment 136.

The segmented turbine shroud 110 may be assembled by a method including assembling a plurality of shroud segments 120 and locating a plurality of circumferential seals 130 between pairs of circumferentially adjacent shroud segments 120. Each shroud segment 120 may be assembled by coupling a blade track segment 136 to a carrier segment 134 and engaging both segments 134, 136 with a retainer 138 to hold the blade track segment 136 in place relative to the carrier segment 134.

Assembly of the turbine shroud segment 120 also includes arranging radial seal elements 131, 132 and the axial seal elements 181, 182 between the blade track segment 136 and the carrier segment 134. The circumferential seal 130 may be located by inserting the circumferential seal 130 (illustratively a strip seal) into the seal-locating features 143, 145 (illustratively seal-receiving slots) formed in the end caps 142, 144 of carrier segments 134. In some embodiments, the circumferential seal 130 may be a plurality of small strip seals that are each inserted into the seal-locating features 143, 145 formed in the end caps 142, 144 of carrier segments 134.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A segmented turbine shroud that extends around a central axis, the segmented turbine shroud comprising
   a first shroud segment including a first carrier segment, a first blade track segment, and a first retainer that couples the first carrier segment to the first blade track segment, the first blade track segment made from a ceramic-matrix-composite material,
   a second shroud segment arranged circumferentially adjacent to the first shroud segment around the central axis, the second shroud segment including a second carrier segment, a second blade track segment, and a second retainer that couples the second carrier segment to the second blade track segment, the second blade track segment made from a ceramic-matrix-composite material, and
   a circumferential seal arranged between the first shroud segment and the second shroud segment to block gasses from passing through a circumferential interface of the first shroud segment and the second shroud segment, the circumferential seal engaging a first seal-locating feature formed in the first carrier segment and a second seal-locating feature formed in the second carrier segment so that the circumferential seal is held in place circumferentially between the first shroud segment and the second shroud segment,
   wherein the each carrier segment includes a central attachment body engaged with a corresponding blade track segment and a pair of end caps that extend circumferentially in opposing directions from the central attachment body and each end cap is formed to include a seal-locating feature, and
   wherein a closed cavity is formed by the first shroud segment between the first carrier segment and the first blade track segment, the closed cavity extends along the central attachment body of the first carrier segment, the closed cavity is radially bounded by the blade track segment, and the closed cavity is circumferentially bounded by the pair of end caps.

2. The segmented turbine shroud of claim 1, wherein the circumferential seal is a strip seal, the first seal-locating feature is a first seal-receiving slot that extends circumferentially into the first carrier segment, and the second seal-locating feature is a second seal-receiving slot that extends circumferentially into the second carrier segment.

3. The segmented turbine shroud of claim 1, wherein the pair of endcaps close off circumferential ends of a radially inwardly opening channel formed by the central attachment body.

4. The segmented turbine shroud of claim 1, wherein the central attachment body of the first carrier segment is formed to include a spar, a forward hanger bracket coupled to the spar, and an aft hanger bracket coupled to the spar.

5. The segmented turbine shroud of claim 4, wherein the first blade track segment includes a runner, a forward hanger arm that engages the forward hanger bracket included in the first carrier segment, and an aft hanger arm that is engaged along with the aft hanger bracket of the first carrier segment by the first retainer.

6. The segmented turbine shroud of claim 1, wherein the first blade track segment includes a runner, a forward hanger arm that engages the first carrier segment, and an aft hanger arm that is engaged along with the first carrier segment by the first retainer.

7. The segmented turbine shroud of claim 6, wherein the forward hanger arm includes a first portion that extends outward in a radial direction and a second portion that extends forward in an axial direction and the aft hanger arm includes a first portion that extends outward in the radial direction and a second portion that extends rearward in the axial direction.

8. The segmented turbine shroud of claim 7, wherein the first retainer forms an axially-opening channel that receives the second portion of the aft hanger arm included in the first blade track segment.

9. A turbine shroud segment comprising
a carrier segment including a central attachment body and a pair of end caps that extend in opposing directions from the central attachment body, each end cap being formed to include a seal-locating feature,
a blade track segment made from a ceramic-matrix-composite material supported by the carrier segment, and
a retainer that receives a portion of the carrier segment and a portion of the blade track segment to couple the blade track segment to the carrier segment,
wherein a closed cavity is formed between the carrier segment and blade track segment, the closed cavity extends along the central attachment body of the carrier segment, the closed cavity is radially bounded by the blade track segment, and the closed cavity is circumferentially bounded by the pair of end caps.

10. The turbine shroud segment of claim 9, wherein the seal-locating feature included in each end cap is a seal-receiving slot that extends circumferentially into the carrier segment.

11. The turbine shroud segment of claim 10, wherein seal-receiving slot included in each end cap is sized to receive a strip seal.

12. The turbine shroud segment of claim 9, wherein the central attachment body of the carrier segment is formed to include a spar, a forward hanger bracket that extends radially inwardly from the spar, and an aft hanger bracket that extends radially inwardly from the spar and the closed cavity extends axially from the forward hanger bracket to the aft hanger bracket.

13. The turbine shroud segment of claim 9, wherein the blade track segment is formed to include a runner, a forward hanger arm that extends radially outwardly from the runner, and an aft hanger arm that extends radially outwardly from the runner and the closed cavity extends axially from the forward hanger arm to the aft hanger arm.

14. The turbine shroud segment of claim 13, wherein the forward hanger arm includes a first portion that extends outward in a radial direction and a second portion that extends forward in an axial direction and the aft hanger arm includes a first portion that extends outward in the radial direction and a second portion that extends rearward in the axial direction.

15. The turbine shroud segment of claim 14, wherein the retainer forms an axially-opening channel that receives the second portion of the aft hanger arm included in the blade track segment.

16. A method of making a turbine shroud adapted for use in a gas turbine engine, the method comprising
assembling a first shroud segment by moving a first blade track segment made from a ceramic matrix composite material into a predetermined position relative to a first carrier and inserting a portion of both the first blade track segment and the first carrier into a first retainer to couple the first blade track segment to the first carrier,
assembling a second shroud segment by moving a second blade track segment made from a ceramic matrix composite material into a predetermined position relative to a second carrier and inserting a portion of both the second blade track segment and the second carrier into a second retainer to couple the second blade track segment to the second carrier, and
inserting a strip seal into a first seal-receiving slot formed in the first carrier and into a second seal-receiving slot formed in the second carrier so that the strip seal extends from the first shroud segment to the second shroud segment,
wherein a closed cavity is formed between the first carrier segment and first blade track segment, the closed cavity extends along the first carrier segment, the closed cavity is radially bounded by the first blade track segment, and the closed cavity is circumferentially bounded by a pair of end caps included in the first carrier segment.

\* \* \* \* \*